(12) United States Patent
Bloodworth et al.

(10) Patent No.: US 7,889,452 B2
(45) Date of Patent: Feb. 15, 2011

(54) HARD DISK DRIVE PREAMPLIFIER TIMERS AND METHODS TO CALIBRATE HARD DISK DRIVE PREAMPLIFIER TIMERS

(75) Inventors: Bryan E. Bloodworth, Coppell, TX (US); Nilakantan Seshan, Plano, TX (US); Benjamin Sarpong, Dallas, TX (US); Ashish Manjrekar, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 304 days.

(21) Appl. No.: 12/059,690

(22) Filed: Mar. 31, 2008

(65) Prior Publication Data

US 2009/0244758 A1    Oct. 1, 2009

(51) Int. Cl.
*G11B 15/12* (2006.01)
*G11B 5/09* (2006.01)
*G11B 5/02* (2006.01)

(52) U.S. Cl. .............................. 360/61; 360/46; 360/62; 360/67

(58) Field of Classification Search .................. 360/46, 360/67

See application file for complete search history.

(56) References Cited

U.S. PATENT DOCUMENTS

| 5,436,583 | A  | * | 7/1995 | Fujii et al. | 327/165 |
| 5,517,146 | A  | * | 5/1996 | Yamasaki | 327/276 |
| 6,433,945 | B1 | * | 8/2002 | Norton, Jr. | 360/46 |
| 7,595,951 | B2 | * | 9/2009 | Dolan et al. | 360/62 |

* cited by examiner

*Primary Examiner*—Daniell L Negrón
*Assistant Examiner*—Regina N Holder
(74) *Attorney, Agent, or Firm*—Dawn V. Stephens; Wade James Brady, III; Frederick J. Telecky, Jr.

(57) ABSTRACT

Hard disk drive preamplifier timers and methods to calibrate hard disk drive preamplifier timers are disclosed. A timer in a hard disk drive preamplifier comprises a first switch to selectively store charge in a storage device based on an input signal, the storage device receiving a first current and storing the charge to cause the storage device to have a first voltage that increases at a first rate; a compensation device to cause the first voltage to be substantially equal to a second voltage after a predetermined time period; and a trigger to output a signal when the first voltage is substantially equal to the second voltage, the predetermined time period controlling a transition time between a first hard disk drive operating condition and a second hard disk drive operating condition different than the first operating condition.

14 Claims, 5 Drawing Sheets

HARD DISK DRIVE PREAMPLIFIER TIMERS AND METHODS TO CALIBRATE HARD DISK DRIVE PREAMPLIFIER TIMERS

FIELD OF THE DISCLOSURE

The present disclosure relates generally to hard disk drives and, more particularly, to hard disk drive preamplifier timers and methods to calibrate hard disk drive preamplifier timers.

BACKGROUND

A hard disk drive (HDD) is a non-volatile storage device that stores digitally encoded data on rotating platters that have an associated magnetic surface. A hard disk drive includes a spindle that holds at least one platter having a magnetic surface. At least a portion of the magnetic surface is magnetized with information thereon and a read head detects the magnetized portions of the magnetic surface to read data therefrom and a write head excites the magnetic surface to write data thereto. A HDD preamplifier typically controls the read and write operations of the HDD, which includes several different modes of operations (e.g., sleep, read, idle, write, head select, etc.). To change the operating modes of the HDD (e.g., sleep to read, read to write, etc.), a particular sequence of events is carried out to enable and/or disable devices of the HDD preamplifier. The HDD preamplifier includes timers to enable or disable the circuits of the HDD preamplifier to change the operating mode of the HDD.

FIG. 1 is an illustration of a timer 100 in a preamplifier of a HDD. In the operation of FIG. 1, an input 102 receives a voltage and either turns on or turns off a N-channel metal oxide semiconductor (NMOS) transistor 104. When the NMOS transistor 104 is turned on, the NMOS transistor 104 causes a current provided via a current source 106 to flow into a ground. As a result, a capacitor 110 is not charged. A comparator 108 that compares the voltage at the drain of the NMOS transistor 104 to a voltage reference $V_{REF}$ 112 outputs a low voltage. However, when the NMOS transistor 104 is turned off, the current from the current source 106 flows into the capacitor 110 where it is stored and increases the voltage of the capacitor 110. Initially, the comparator 108 outputs a low voltage. However, as the charge of the capacitor 110 increases, the voltage at the drain of the transistor 104 increases. After a period of time (i.e., a time delay), the voltage at the drain of the transistor exceeds the voltage reference $V_{REF}$ and the comparator 108 outputs a high voltage.

DETAILED DESCRIPTION

Hard disk drive preamplifier timers and methods to calibrate hard disk drive preamplifier timers are disclosed. Although the example methods and apparatus described herein generally relate to timers in hard disk drives, the disclosure is not limited to such. On the contrary, the teachings of this disclosure may be applied in any device that would benefit from precise timing circuits.

Figure 1:
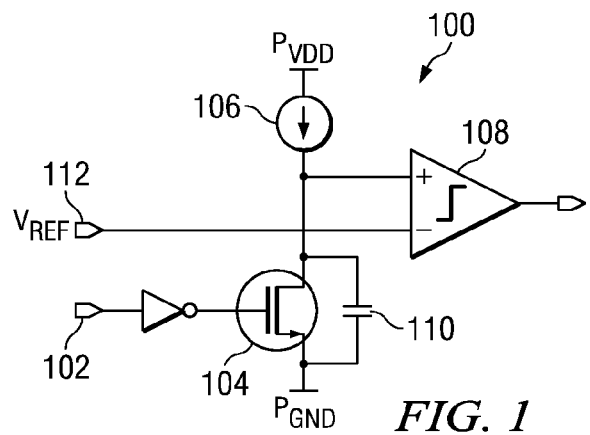
FIG. 1 illustrates a timer that may be implemented in a hard disk drive.
Figure 2:
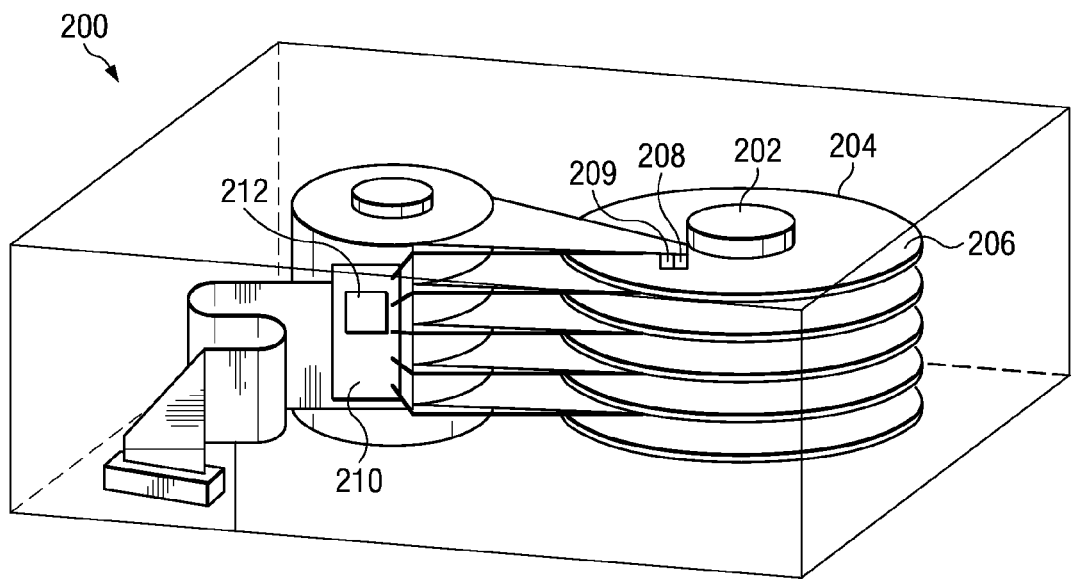
FIG. 2 illustrates an example hard disk drive including a timer described herein.

FIG. 2 is an illustration of a hard disk drive 200 having a spindle 202 that holds at least one platter 204 having a magnetic surface 206. At least a portion of the magnetic surface 206 is magnetized with digitally encoded data thereon and a read head 208 detects the magnetized portions of the magnetic surface 206 and a write head 209 writes information thereto. Generally, a HDD preamplifier 210 controls the read and write operations of the HDD 200 and, as a result, also controls different operating conditions of associated with the operation of the HDD (e.g., write, read, sleep, idle, etc.). The HDD preamplifier 210 also controls the transitions between the different operating conditions (e.g., read to write, write to read, head select, etc.). Further, the HDD preamplifier 210 also conditions the signal in preparation for interfacing the hard disk drive 200 with an electronics device such as a computer, for example. As a result, the HDD preamplifier 210 includes one or more timers 212 therein to facilitate the transitions between the different operating conditions of the HDD 200.

Figure 3:
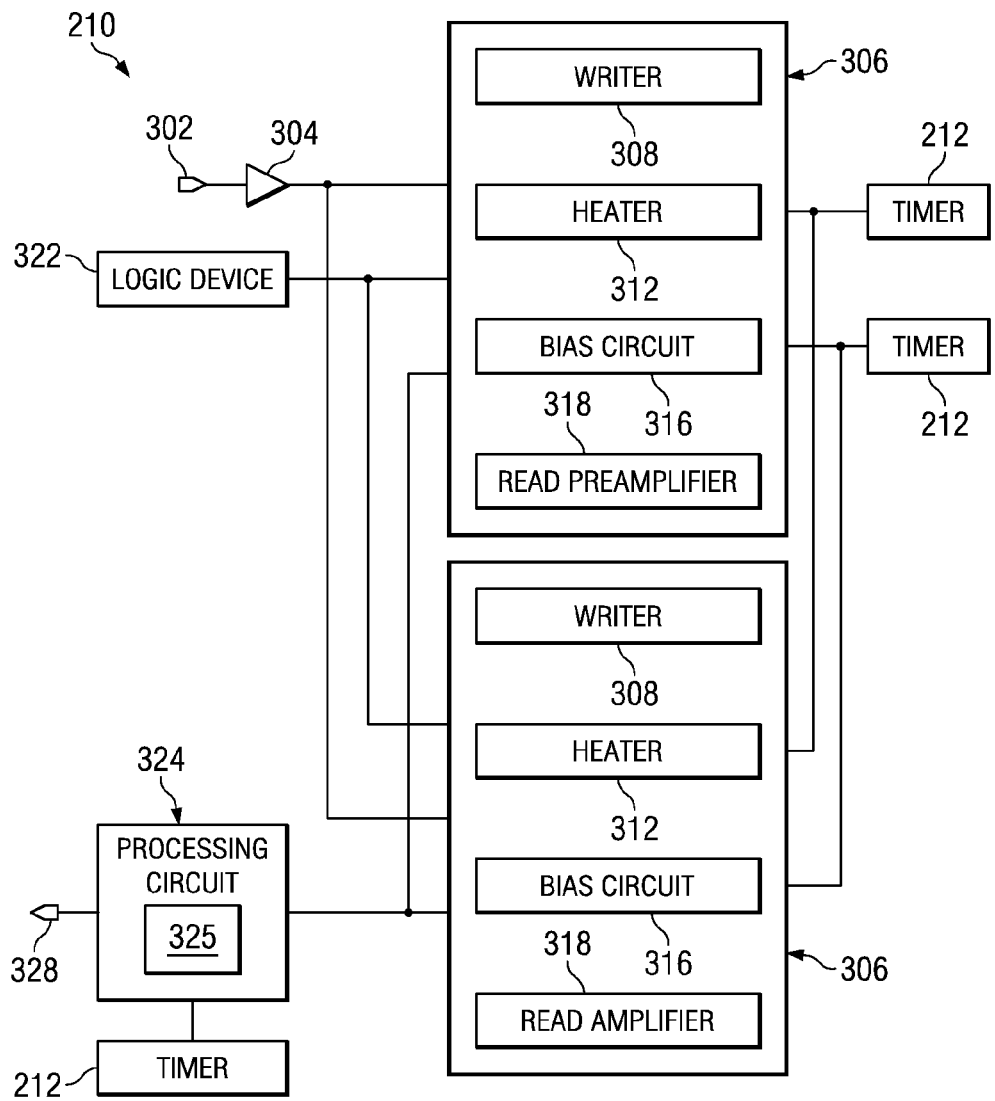
FIG. 3 is a block diagram of the example preamplifier of the hard disk drive of FIG. 2.

FIG. 3 is a block diagram an example HDD preamplifier 210 that includes one or more timers 212. In the illustrated example, the HDD preamplifier 210 receives write data to store the data in the HDD 200. The HDD preamplifier receives the write data via an input 302, which is coupled with a buffer 304. The buffer 304 further conveys the write data to at least one reader/writer circuit 306 that is associated with a corresponding platter 204, read head 208, and write head 209.

The reader/writer circuit 306 generally includes a writer 308 to cause the reader/writer circuit 306, and more particularly, the write head 209 to write data to the platters 204. Further, the reader/writer circuit 306 includes a heater 312 to control the fly height of the read head 208 and the write head 209 relative to the platter 204. A bias circuit 316 of the reader/writer circuit 306 forms a substantially constant bias current or bias voltage to excite its corresponding read head 208, thereby causing the read head 208 to form an information signal having data thereon. Further, the reader/writer circuit 306 also includes a read preamplifier 318 to amplify the information signal provided via the read head 208.

The example HDD preamplifier 210 includes a logic device 322 that is coupled to the read/write control circuit 306 to control its operations. In some examples, the example HDD preamplifier 210 may selectively actuate the writer 308 to thereby write data to different platters 204. Further, the read preamplifier 318 is coupled to a processing circuit 324, which processes the information signals (e.g., filtering, boosting, multiplexing, etc.). In particular, the processing circuit 324 includes a multiplexer 325 therein, for example, to selectively couple the read/write control circuits 306 to an output 328 of the HDD preamplifier. In the illustrated example, the multiplexer 325 may be actuated to couple the timer 212 to the output 328 to measure its associated time delay. The processing circuit 324 conveys the information signal to the output 328 of the HDD preamplifier 210, which is generally connected to other devices to detect the data contained in the information signal. Of course, the illustrated example of FIG. 3 is a high level overview of the HDD preamplifier 210 and the devices contained therein (e.g., the writer 308, etc.) include yet more circuits to operate the HDD 200.

The HDD preamplifier 210 turns off its associated devices (e.g., the writer 308, etc.) to conserve power and prevent errors in the read and write operations of the HDD 200. In some examples, a write operation of the HDD 200 is a high power operation that causes substantial amounts of interference and noise to be present in the HDD preamplifier 210. At the same time, a read operation of the HDD 200 is a low power operation and is sensitive to noise and interference, for example. As a result, the HDD preamplifier 210 selectively enables the devices associated with the read operation. That is, the HDD preamplifier 210 selectively disables devices contained therein based on the operating condition. Of course, in the event that the HDD preamplifier 210 switches between a first operating condition (e.g., write) and a second operating condition (e.g., read), the HDD preamplifier 210 must therefore turn on the devices associated with the second operating condition.

Typically, the devices associated of the HDD preamplifier 210 are also sensitive and may oscillate, for example. As a result, the different devices must be selectively actuated in a particular sequence of events. In some examples, when the HDD preamplifier is transitioning in a read operation, the HDD preamplifier 210 enables the bias circuit 316, which biases the read head 208 and forms the information signal. After a time delay (e.g., 20 nanoseconds), the HDD preamplifier 210 actuates the read preamplifier 318 to receive the information signal. Further still, after another time delay (e.g., 20 nanoseconds), the HDD preamplifier 210 actuates the processing circuit 324. Thus, one or more time references are needed to facilitate coordination of these tasks.

In the illustrated example, the example HDD preamplifier 210 cannot include a digital timer because it would cause interference with the devices contained therein. As a result, the HDD preamplifier 210 includes one or more example timers 212 to selectively actuate the different devices (e.g., the writers 308, the etc.) of the HDD preamplifier 210 in a particular sequence. In the illustrated example, the example timers 212 are coupled to the read/write circuits 306 and the processing circuit 324 to selectively actuate the devices therein. Of course, the example timers 212 could be placed in any suitable configuration such as integral with the read/write circuits 306, for example.

Figure 4:
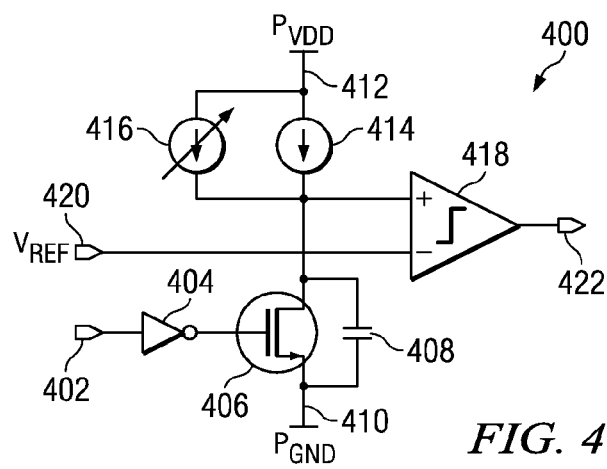
FIG. 4 is schematic diagram of an example timer circuit of the preamplifier of FIG. 3.

FIG. 4 illustrates an example circuit 400 to implement the timer 212 in the example HDD preamplifier 210. In the example of FIG. 4, an input 402 receives an input signal to cause an associated device to turn on. The input 402 is coupled to an inverter 404 that inverts the incoming signal from a logic high voltage (e.g., 3.0 volts, etc.) to a logic low voltage (e.g., zero volts, etc.), and vice-versa. The inverter 404 is coupled to an N-channel metal-oxide-semiconductor (NMOS) transistor 406, which receives the inverted input signal via its gate. In the example of FIG. 4, the source of the NMOS transistor 406 is coupled to a reference signal $P_{GND}$ 410 (e.g., analog ground, system ground, etc.) and the drain of the NMOS transistor 406 is coupled to its source via a capacitor 408.

Generally, the capacitor 408 is designed to have a fixed capacitance. However, in semiconductor processes, the capacitance of the capacitor 408 can change significantly due to changes in the semiconductor processes (e.g., temperature, humidity, oxide thickness, etc.), thereby resulting in up to 20% variations in the capacitance value. Further, even capacitance values can vary substantially across a wafer on which the HDD preamplifier 210 is manufactured.

The drain of the NMOS transistor 406 is also coupled to a power source $P_{VDD}$ 412 via a current source 414, which limits the current flowing from the power source 412. The current source 414 of the example of FIG. 4 may be implemented by any suitable circuit or device to provide a substantially constant current, such as a NMOS transistor biased with a constant voltage to provide a constant current, for example. The drain of the NMOS transistor 406 is also coupled to the power source via a variable current output compensation device 416, which compensates for the current (i.e., adds or subtracts) of the current source 414. As described below, the compensation device 416 compensates for variations in the time delay (i.e., time constants) due to semiconductor manufacturing processes that cause variations in the capacitor 410.

In the illustrated example, the drain of the NMOS transistor 406 is also coupled to a non-inverting input of a comparator 418. The inverting input of the comparator 418 is coupled a voltage reference $V_{REF}$ 420. The output of the comparator 418 is coupled to an output 422 of the example circuit 400.

Figure 5:
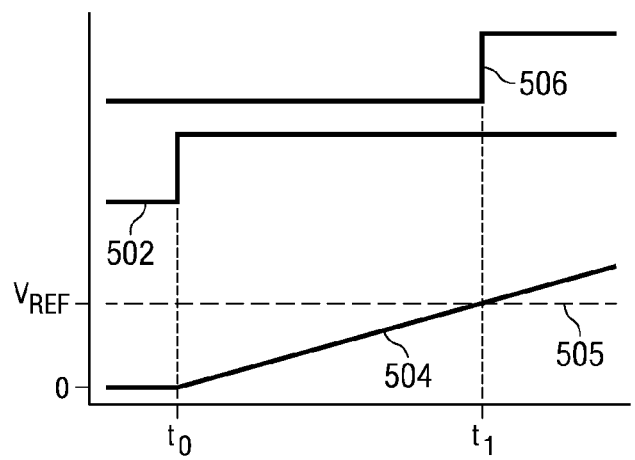
FIG. 5 is a graph illustrating the operation of the timer circuit of FIG. 4.

The operation of FIG. 4 will be explained in conjunction with the example of FIG. 5, which illustrates the input voltage at the input to the inverter 404 denoted by reference numeral 502, the voltage of the non-inverting input of the comparator 418 denoted by reference numeral 504, a reference voltage at the inverting input of the comparator 418 denoted by reference numeral 505, and the output voltage denoted by reference numeral 506. Initially, as illustrated in the example of FIG. 5, the input 402 is initially a low voltage and the comparator 418 outputs a low voltage. As a result, the current source 414 and the compensation device 416 provide the substantially constant reference current that flows into the reference signal 410 via the NMOS transistor 406. At time $t_0$, the input 402 receives a high voltage and the inverter 404 conveys a low voltage to the gate of the NMOS transistor 406, thereby turning the NMOS transistor 406 off and preventing bypass of the capacitor 408 and the flow of current into the reference signal 410. In response, after time $t_0$, the current source 414 supplies the reference current into the capacitor 408, thereby storing charge in the capacitor 410. As charge stores in the capacitor 408, the voltage at the drain of the NMOS transistor 406 increases and, thus, the voltage at the non-inverting input of the comparator 418 increases. At time $t_1$, the voltage at the non-inverting input of the comparator 418 exceeds the voltage of the voltage reference 420 and the comparator 418 outputs a logic high voltage.

Thus, FIG. 4 has a time delay (i.e., the time between $t_0$ and $t_1$) that is dependent on the capacitance of the capacitor 408. As described above, in semiconductor processes, the capacitance of the capacitor 408 can vary significantly due to semiconductor manufacturing processes, thereby resulting in up to 20% timing error associated with the operation of the example circuit 400 because capacitors of different size charge at different rates. However, the compensation device 416 either adds or removes current provided via the current source 414 based on the capacitor 408. In some examples, the compensation device 416 is a one-time programmable (OTP)

circuit associated with the current source 414 and is configured based on a measurement associated with the example circuit 400. In response to the measurement during testing, for example, the compensation device 416 is configured to provide a compensation current, which causes the example timer 212 to have a time delay substantially equal to a predetermined value (e.g., 20 nanoseconds) despite variations in the capacitor 408 due to semiconductor manufacturing processes. In other examples, the compensation device 416 is an associated circuit element of the current source 414, such as a resistor, and modifies (i.e., increases or decreases) the current that the current source 414 provides.

Figure 6:
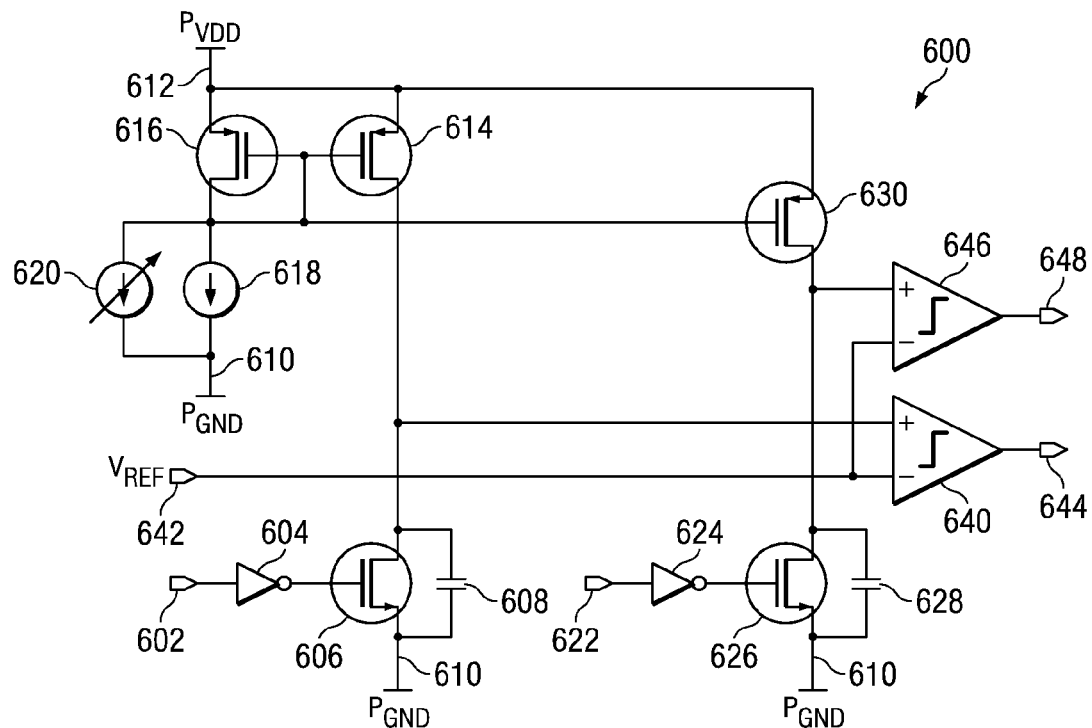
FIG. 6 is a schematic diagram of another example timer circuit of the preamplifier of FIG. 3.

Of course, an example HDD preamplifier 210 includes a plurality of devices that need timers to control the transitions between different operating conditions of the HDD 200. FIG. 6 illustrates another example circuit 600 to implement a timer 212 having a plurality of outputs to accommodate the devices of the HDD preamplifier 210. The corresponding outputs of the example circuit 600 can be configured to have the same or different time delays. In the example of FIG. 6, an input 602 receives an input signal to cause an associated device (e.g., a read amplifier, etc.) to either turn on or off. The input 602 is coupled to an inverter 604 that inverts the incoming signal from a logic high voltage (e.g., 3.0 volts, etc.) to a logic low voltage (e.g., zero volts, etc.), and vice-versa. The inverter 604 conveys the inverted input signal to an NMOS transistor 606 which receives the inverted input signal via its gate. The drain of the NMOS transistor 606 is coupled to its source via a capacitor 608. In the example of FIG. 6, the source of the NMOS transistor 606 is also coupled to a reference signal $P_{GND}$ 610 (e.g., analog ground, system ground, etc.).

The drain of the NMOS transistor 606 is also coupled to a power source $P_{VDD}$ 612 via a current mirror 614, which limits the current flowing through the example circuit 600. In the illustrated example, the current mirror 614 is implemented by a P-channel metal-oxide-semiconductor (PMOS) transistor 614, for example. The source of the PMOS transistor 614 is coupled to the power source 612 and its drain is coupled to the drain of the NMOS transistor 606. The gate of the PMOS transistor 614 is coupled to a current reference that is implemented by a PMOS transistor 616. In particular, the gate of the PMOS transistor 614 is coupled to both the gate and drain of the PMOS transistor 616. The source of the PMOS transistor 616 is coupled to the power source 612 and the drain of the PMOS transistor 616 is coupled to the reference signal 610 via a current sink 618. Further, the drain of the PMOS transistor 616 is coupled to the reference signal 610 via a compensation device 620.

In the example of FIG. 6, the example circuit 600 is coupled to a plurality of devices and multiple timers are required. As a result, a second input 622 receives an input signal to cause an associated device of the HDD preamplifier 210 to turn on. The input 622 is coupled to an inverter 624 that inverts the input signal from a logic high voltage (e.g., 3.0 volts, etc.) to a logic low voltage (e.g., zero volts, etc.), and vice-versa. The inverter 624 conveys the inverted input signal to the gate of an NMOS transistor 626. The drain of the NMOS transistor 626 is coupled to its source via a capacitor 628. In the example of FIG. 6, the source of the NMOS transistor 626 is coupled to the reference signal 610 (e.g., analog ground, system ground, etc.). In the illustrated example, the capacitors 608, 628 may be configured to have substantially equal capacitances, therefore having substantially equal time delays. Additionally or alternatively, the capacitors 608, 628 may be configured to have substantially different capacitances, thereby having different time delays.

The drain of the NMOS transistor 626 is also coupled to the power source 612 via a current mirror 630. In the illustrated example, the current mirror 630 is implemented by a PMOS transistor 630. The source of the PMOS transistor 630 is coupled to the power source 612 and its drain is coupled to the drain of the NMOS transistor 626. The gate of the PMOS transistor 630 is coupled to both the gate and drain of the PMOS transistor 616. The PMOS transistors 614, 616, 630 of the illustrated example are configured to have substantially equal device characteristics (e.g., width-to-length ratio, threshold voltage, etc.).

A first output of the example circuit 600 is implemented by a comparator 640, which is coupled to the drain of the NMOS transistor 606 via its non-inverting input. Further, the comparator 640 is coupled to a voltage reference $V_{REF}$ 642 via its inverting input. The output of the comparator 640 is coupled to a first output 644 of the example timer 212. Further, a second output of the example circuit 600 is implemented by a comparator 646, which is coupled to the drain of the NMOS transistor 606 via its non-inverting input and the comparator 646 is also coupled to the voltage reference $V_{REF}$ 642 via its inverting input. The output of the comparator 646 is coupled to a second output 648 of the example timer 212.

In the operation of the illustrated example, the current sink 618 sinks a predetermined current from the power source 612, which flows from the power source 612 through the PMOS transistor 616 and into the reference signal 610. Further, the compensation device 620 adds or removes a compensation current flowing into the reference signal 610. Thus, as a result, the current source 618 and the compensation device 620 force the PMOS transistor 616 to draw the reference current from the power source 612.

Because the reference current flows via the PMOS transistor 616, the PMOS transistor 616 selects its gate-source voltage to provide the reference current. In the illustrated example, the gate-source voltages of the PMOS transistors 614, 630 are configured to be substantially equal to the gate-source voltage of the PMOS transistor 616 and, in response, the PMOS transistors 614, 630 are both configured to source a current substantially equal to the reference current.

In response to the reference current provided via PMOS transistor 614, the NMOS transistor 606 and the capacitor 608 are configured to have a time delay. In particular, a high voltage from the input 602 causes the inverter 604 to convey a low voltage to the gate of the NMOS transistor 606, thereby turning it off. However, when the NMOS transistor 606 is turned off, the reference current from the PMOS transistor 614 flows into the capacitor 608, which prevents the reference current from flowing into the reference signal 610. However, the capacitor 608 stores the reference current as a charge therein and, as a result, increases the voltage at the drain of the NMOS transistor 606. After a period of time, the drain voltage of the NMOS transistor 606 exceeds voltage of the reference voltage 642. In other words, the non-inverting input of the comparator 640 exceeds the voltage of the voltage reference 642 and, in response, the comparator 640 conveys a high voltage to the output 644.

The operation of the second output of the example circuit 600 works in substantially the same manner. As described above, the PMOS transistor 630 is configured to source a current substantially equal to the reference current to the NMOS transistor 626. In response to the current provided via the PMOS transistor 630, the NMOS transistor 626 and the capacitor 628 are configured to have a time delay. In particular, a high voltage from the input 622 causes the inverter 624 to convey a low voltage to the gate of the NMOS transistor 626, thereby turning it off. However, when the NMOS transistor 626 is turned off, the reference current from the PMOS transistor 630 flows into the capacitor 628, which prevents the reference current from flowing into the reference signal 610. However, the capacitor 628 stores the reference current as a charge therein and, as a result, increases the voltage at the drain of the NMOS transistor 626. After a period of time, the drain voltage of the NMOS transistor 626 exceeds voltage of the reference voltage 642. In other words, the non-inverting input of the comparator 646 exceeds the voltage of the voltage reference 642 and, in response, the comparator 646 outputs a high voltage to the output 648.

In the example of FIG. 6, the example circuit 600 includes a plurality of outputs that are compensated via the compensation device 620. In other words, the delays of the example circuit 600 can be configured to have precise delays that are calibrated based on the capacitances of the capacitors 608, 628. In the illustrated example, the compensation device 620 is configured to provide a current based on the average capacitance value of the capacitors 608 and 628.

Figure 7:
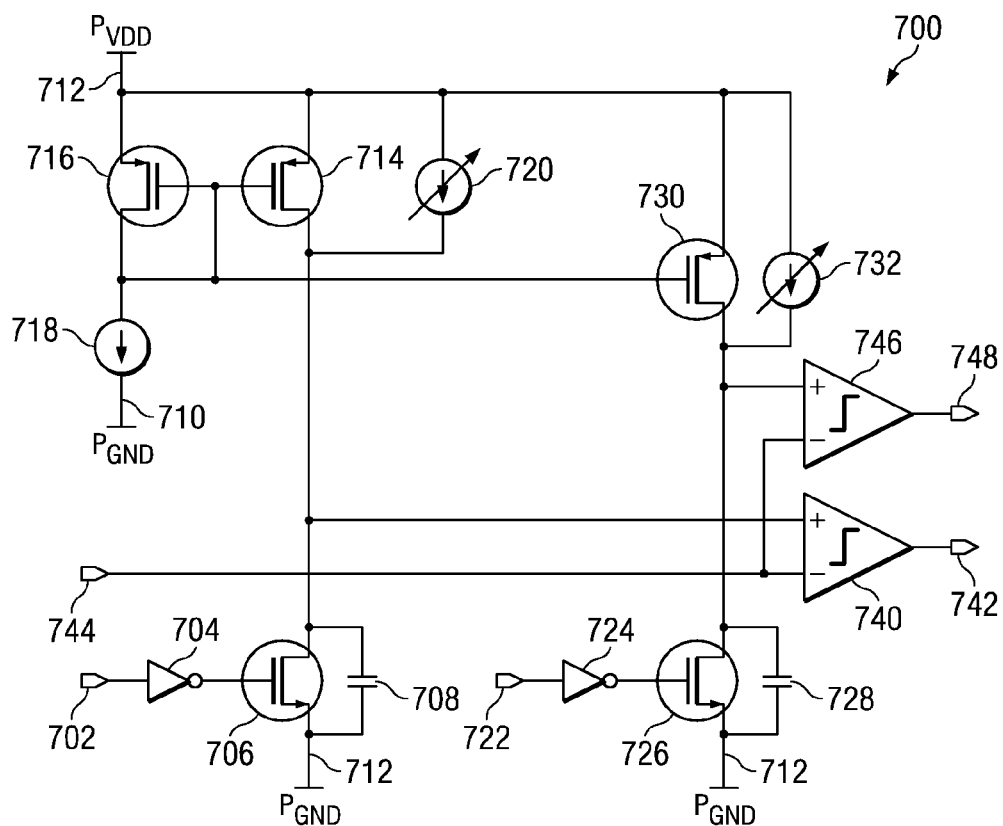
FIG. 7 is a schematic diagram of yet another example timer circuit of the preamplifier of FIG. 3.

FIG. 7 illustrates another example circuit 700 to implement the timer 212 that includes a plurality of outputs. Specifically, the outputs of the example circuit 700 can be configured to have the same or different time delays. In the example of FIG. 7, an input 702 receives an input signal to cause an associated device of the HDD preamplifier 210 to turn on or off. The input 702 is coupled to an inverter 704 that inverts the input signal from a logic high voltage (e.g., 3.0 volts, etc.) to a logic low voltage (e.g., zero volts, etc.), and vice-versa. The inverter 704 conveys the inverted input signal to the gate of an NMOS transistor 706. The drain of the NMOS transistor 706 is coupled to its source via a capacitor 708. In the example of FIG. 7, the source of the NMOS transistor 706 is also coupled to a reference signal $P_{GND}$ 710 (e.g., analog ground, system ground, etc.).

The drain of the NMOS transistor 706 is also coupled to a power source $P_{VDD}$ 712 via a current mirror, which limits the current flowing through the example circuit 700. In the illustrated example, the current mirror is implemented by a PMOS transistor 714, for example. The source of the PMOS transistor 714 is coupled to the power source 712 and its drain is coupled to the drain of the NMOS transistor 706. The gate of the PMOS transistor 714 is coupled to both the gate and drain of the PMOS transistor 716. The source of the PMOS transistor 716 is coupled to the power source 712 and the drain of the PMOS transistor 716 is coupled to the reference signal 710 via a current sink 718. A compensation device 720 is also coupled from the drain of the PMOS transistor 716 to the reference signal 710.

In the example of FIG. 7, the example circuit 700 is coupled to a plurality of devices and, as such, multiple timers are implemented. As a result, a second input 722 receives an input signal to cause an associated device of the HDD preamplifier to either turn on or off. The input 722 is coupled to an inverter 724 that inverts the incoming signal from a logic high voltage (e.g., 3.0 volts, etc.) to a logic low voltage (e.g., zero volts, etc.), and vice-versa. The inverter 724 in coupled to an NMOS transistor 726, which receives the inverted input signal via its gate. The drain of the NMOS transistor 726 is coupled to its source via a capacitor 728. In the example of FIG. 7, the source of the NMOS transistor 726 is coupled to the reference signal $P_{GND}$ 710 (e.g., analog ground, system ground, etc.).

The drain of the NMOS transistor 726 is also coupled to a power source $P_{VDD}$ 712 via a current mirror, which limits the current flowing through the example circuit 700. In the illustrated example, the current mirror is implemented by a PMOS transistor 730, for example. The source of the PMOS transistor 730 is coupled to the power source 712 and its drain is coupled to the drain of the NMOS transistor 726. The gate of the PMOS transistor 730 is coupled to both the gate and drain of the PMOS transistor 716. The illustrated example also includes a compensation device 732 that is coupled from the drain of the PMOS transistor 730 to the reference signal 710. The PMOS transistors 714, 716, 730 of the illustrated example are configured to have substantially equal device characteristics (e.g., width-to-length ratio, threshold voltage, etc.).

A first output of the example circuit is implemented by a comparator 740, which is coupled to the drain of the NMOS transistor 706 via its non-inverting input. Further, the comparator 740 is coupled to a voltage reference $V_{REF}$ 744 via its inverting input. The output of the comparator 740 is coupled to a first output 742 of the example circuit 700. Further, a second output of the example circuit 700 is implemented by a comparator 746, which is coupled to the drain of the NMOS transistor 706 via its non-inverting input. The comparator 746 is coupled to the voltage reference $V_{REF}$ 744 via its inverting input. The output of the comparator 746 is coupled to a second output 748 of the example circuit 700.

In the example of FIG. 7, the current sink 718 sinks a predetermined current from the power source 712, which flows from the power source 712 through the PMOS transistor 716 and into the current sink 718. At the same time, the compensation device 720 is configured to add or remove current from the predetermined current provided via the PMOS transistor 716 to form a reference current. As a result the reference current, the PMOS transistor 716 is forced to draw the reference current from the power source 712 and, thus, the PMOS transistor 716 selects its gate-source voltage to provide the reference current. In the illustrated example, the gate-source voltages of the PMOS transistors 714, 730 are configured to be substantially equal to the gate-source voltage of the PMOS transistor 716. In response, the PMOS transistors 714, 730 are both configured to source a current substantially equal to the reference current.

In response to the reference current, the NMOS transistor 706 and the capacitor 708 are configured to have a time delay. In particular, a high voltage from the input 702 causes the inverter 704 to convey a low voltage to the gate of the NMOS transistor 706, thereby turning it off. When the NMOS transistor 706 is turned off, the reference current from the PMOS transistor 714 flows into the capacitor 708, which prevents the reference current from flowing into the reference signal 710. However, the capacitor 708 stores the reference current as a charge therein and, as a result, increases the voltage at the drain of the NMOS transistor 706. After a period of time, the drain voltage of the NMOS transistor 706 exceeds voltage of the reference voltage 744. In other words, the non-inverting input of the comparator 740 exceeds the voltage of the voltage reference 744 and, in response, the comparator 740 outputs a high voltage to the output 742.

The operation of the second output of the example circuit 700 works in substantially the same manner. As described above, the PMOS transistor 730 is configured to source a current substantially equal to the reference current to the NMOS transistor 726. In response to the reference current provided via PMOS transistor 730 and the compensation device 732, the NMOS transistor 726 and the capacitor 728 are configured to have a time delay. In particular, a high voltage from the input 722 causes the inverter 724 to convey a low voltage to the gate of the NMOS transistor 726, thereby turning it off. However, when the NMOS transistor 726 is turned off, the reference current from the PMOS transistor 730 flows into the capacitor 728, which prevents the reference current from flowing into the reference signal 710. The capacitor 728 stores the reference current as a charge therein and, as a result, increases the voltage at the drain of the capacitor 726. After a period of time, the drain voltage of the NMOS transistor 726 exceeds voltage of the reference voltage 746. Thus, the non-inverting input of the comparator 746 exceeds the voltage of the voltage reference 744 and, in response, the comparator 746 outputs a high voltage to the output 748.

The example circuit 700 includes a plurality of outputs that can be compensated via the compensation devices 720 and 732. In other words, the delays of the example circuit 700 can be configured to have precise delays that are individually calibrated based on the capacitances of the capacitors 708 and 728. Moreover, the capacitors 708 and 728 can be configured to have substantially different capacitances such that the example circuit 700 has a plurality of time delays. In the illustrated example, the compensation devices 720, 732 are configured to provide a current based on the individual capacitance values of the capacitors 708 and 728, thereby allowing precise control of the different time delays.

Figure 8:
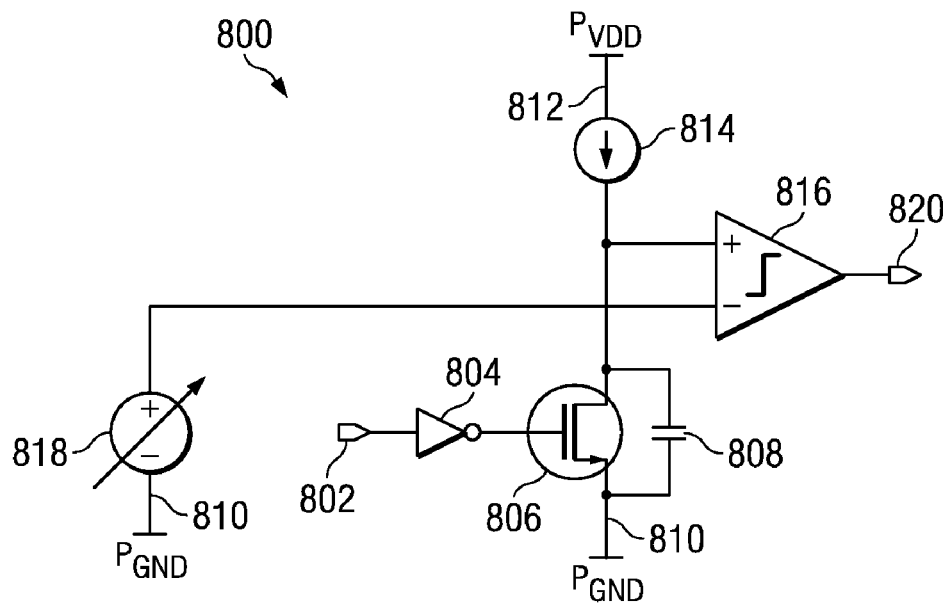
FIG. 8 is a schematic diagram of another example timer circuit of the preamplifier of FIG. 3

FIG. 8 illustrates an example circuit 800 to implement the timer 212 in the example HDD preamplifier 210. In the example of FIG. 8, an input 802 receives an input signal to cause an associated device to turn on. The input 802 is coupled to an inverter 804 that inverts the incoming signal from a logic high voltage (e.g., 3.0 volts, etc.) to a logic low voltage (e.g., zero volts, etc.), and vice-versa. The inverter 804 is coupled to an NMOS transistor 806, which receives the inverted input signal via its gate. In the example of FIG. 8, the source of the NMOS transistor 806 is coupled to a reference signal $P_{GND}$ 810 (e.g., analog ground, system ground, etc.) and the drain of the NMOS transistor 806 is coupled to its source via a capacitor 808.

The drain of the NMOS transistor 806 is also coupled to a power source $P_{VDD}$ 812 via a current source 814, which limits the current flowing from the power source 812. In addition, the drain of the NMOS transistor 806 is also coupled to a non-inverting input of a comparator 816. The inverting input of the comparator 816 is coupled an adjustable voltage reference $V_{REF}$ 818, which causes the example circuit 800 to have an adjustable time delay. In such examples, the adjustable voltage reference 818 is configured during semiconductor manufacturing processes. The output of the comparator 816 is coupled to an output 820 of the example circuit 800.

In response to the current from the current source 814, the example circuit 800 is configured to have a time delay. In particular, a high voltage from the input 802 causes the inverter 804 to convey a low voltage to the gate of the NMOS transistor 806, thereby turning it off. When the NMOS transistor 806 is turned off, the current from the current source 814 flows into the capacitor 808, which prevents the current from flowing into the reference signal 810. However, the capacitor 808 stores the current as a charge therein and, as a result, increases the voltage at the drain of the NMOS transistor 806. After a period of time, the drain voltage of the NMOS transistor 806 exceeds voltage of the adjustable voltage reference 818. That is, the non-inverting input of the comparator 818 exceeds the voltage of the reference voltage 816 and, in response, the comparator 818 outputs a high voltage to the output 820. Thus, the adjustable voltage reference 818 is configured to provide a predetermined time delay.

Figure 9:
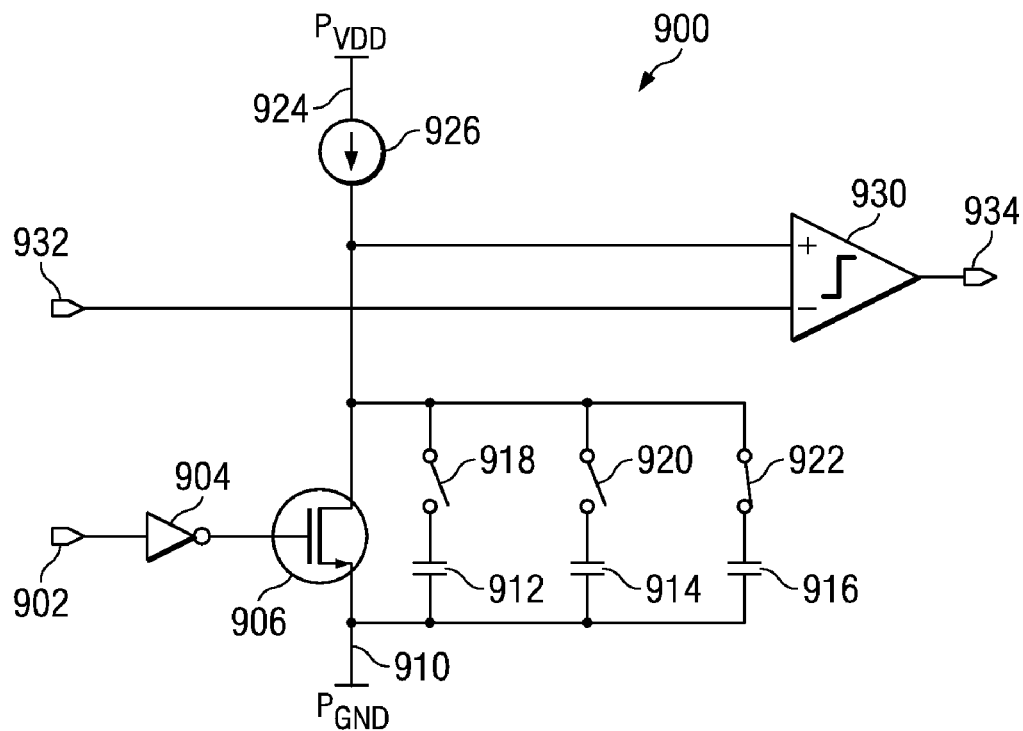
FIG. 9 is a schematic diagram of yet another example timer circuit of the preamplifier of FIG. 3.

FIG. 9 illustrates yet another example circuit 900 that implements the timer 212 in the example HDD preamplifier 210. In the example of FIG. 9, an input 902 receives an input signal to cause an associated device to turn on. The input 902 is coupled to an inverter 904 that inverts the incoming signal from a logic high voltage (e.g., 3.0 volts, etc.) to a logic low voltage (e.g., zero volts, etc.), and vice-versa. The inverter 904 is coupled to an NMOS transistor 906, which receives the inverted input signal via its gate. In the example of FIG. 9, the source of the NMOS transistor 906 is coupled to a reference signal $P_{GND}$ 910 (e.g., analog ground, system ground, etc.).

In the illustrated example, the source of the NMOS transistor 906 is coupled to its respective drain via a first capacitor 912, a second capacitor 916, and a third capacitor 918. Specifically, the capacitors 912, 916, and 918 are electrically coupled to the drain of the NMOS transistor 906 via a first switch 920, a second switch 922, and a third switch 924, respectively. As will be described in detail below, the switches 918, 920, and 922 are selectively uncoupled from the drain of the NMOS transistor 906.

The drain of the NMOS transistor 806 is also coupled to a power source $P_{VDD}$ 924 via a current source 926, which limits the current flowing from the power source 924. In addition, the drain of the NMOS transistor 906 is also coupled to a non-inverting input of a comparator 928. The inverting input of the comparator 928 is coupled a voltage reference $V_{REF}$ 930. The output of the comparator 928 is coupled to an output 932 of the example circuit 900.

In the illustrated example, the capacitors 912, 914, and 916 have different capacitances and are selected to provide a capacitance substantially equal to a desired capacitance. Specifically, as a result of semiconductor process variations (e.g., oxide thickness), at least one of the capacitors 912, 914, or 916 is selected to electrically couple the drain of the NMOS transistor 906 to its source. In some examples, the switches 918, 920, and 922 are implemented by fuses that are selectively blown (i.e., electrically uncoupled), thereby electrically uncoupling at least one of the capacitors 912, 914, and 916 from the drain of the NMOS transistor 906. In the illustrated example, the capacitors 912 and 914 are uncoupled from the drain of the NMOS transistor 906 and the capacitor 916 couples the drain of the NMOS transistor 906 to its source via the switch 922.

In the operation of illustrated example, the example circuit 900 is configured to have a time delay. In particular, a high voltage from the input 902 causes the inverter 904 to convey a low voltage to the gate of the NMOS transistor 906, thereby turning it off. When the NMOS transistor 906 is turned off, the current from the current source 926 flows into the capacitor 916, which prevents the current from flowing into the reference signal 910. However, the capacitor 916 stores the current as a charge therein and, as a result, increases the voltage at the drain of the NMOS transistor 906. After a period of time, the drain voltage of the NMOS transistor 906 exceeds voltage of the adjustable voltage reference 932. In other words, the non-inverting input of the comparator 930 exceeds the voltage of the reference voltage 932 and, in response, the comparator 930 outputs a high voltage to the output 934.

Figure 10:
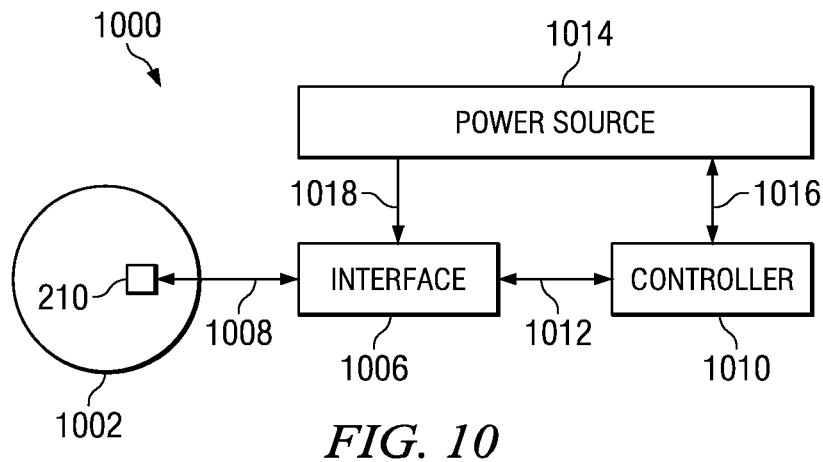
FIG. 10 is a block diagram of a test system to calibrate the an example timer circuit of the preamplifier of FIG. 3.

In the described examples, the circuits that implement the timer 212 experience a one time calibration. FIG. 10 illustrates an example test system 1000 to calibrate the integrated circuits containing the timers 212. In the illustrated example, one or more HDD preamplifiers 210 having one or more timers 212 therein are disposed on a wafer 1002 (e.g., a silicon (Si) wafer, a silicon germanium (SiGe) wafer, a gallium arsenide (GaAs) wafer, etc.). An interface 1006 (e.g., a wafer prober, etc.) is coupled to the HDD preamplifier 210 via line 1008. The interface 1006 is coupled to a controller 1010 (e.g., an automated test program, a manual test procedure, etc.) via line 1012 that controls the calibration process. The controller 1010 also controls other devices such as a power source 1014 via line 1016. The power source 1014 is also coupled to the interface 1006 via line 1018. The interface 1006 allows external devices such as the controller 1010 and the power source 1014 to interface with the HDD preamplifier 210.

Figure 11:
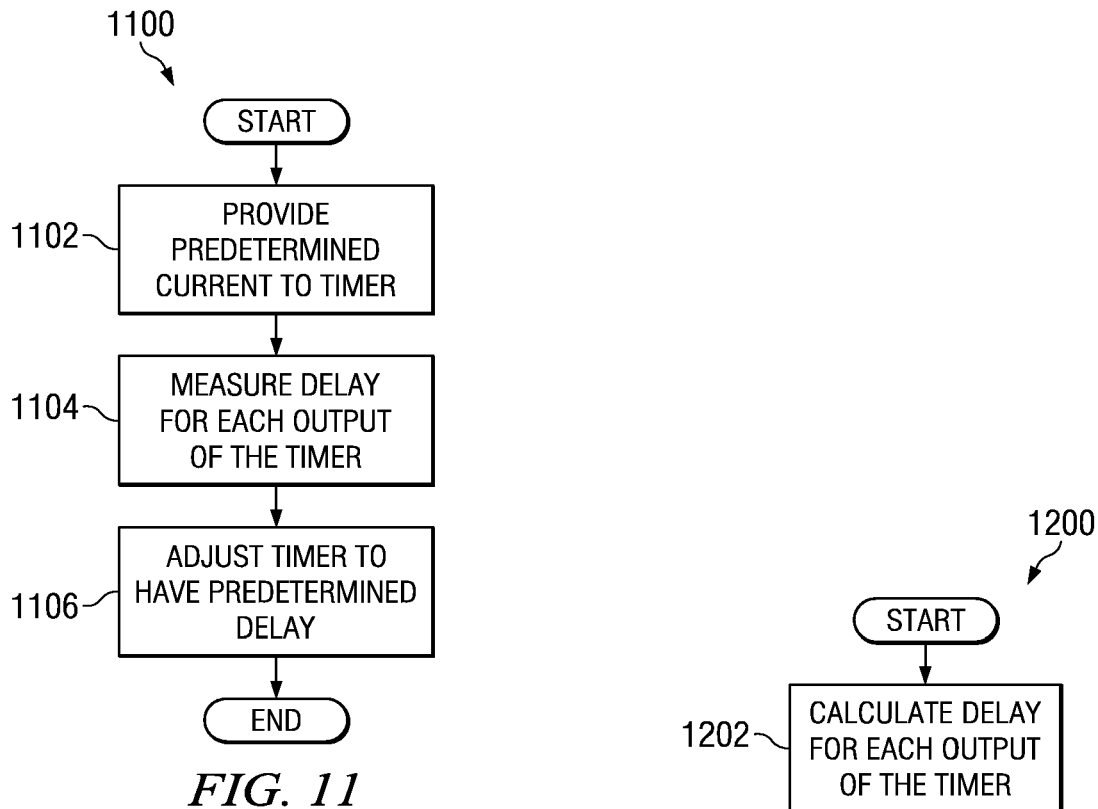
FIG. 11 is a flowchart of an example process the test system of FIG. 10 may implement to calibrate the example timers of FIG. 4, 6, 7, 8, or 9.

In the example of FIG. 11 an example process 1100 the controller 1010 implements to calibrate the timers of FIG. 4, 6, 7, 8, or 9, for example. In some examples, the timers are put into a test mode to calibrate one or more outputs of the timers. In other examples, each output of the timers can be multiplexed and each output can be individually accessed in testing mode and then adjusted (i.e., programmed) to provide a particular delay. The example process 1100 initially begins by actuating the predetermined current (e.g., the current source 414, the current source 618, the current source 718, etc.) of the timers (block 1102).

After actuating the predetermined current, the example process 1100 measures the time delay of the timers (block 1104). In particular, at block 1104, the example process 1100 measures the time delay between providing a current and actuating the output of the timer. As described above, the current stores charge in a capacitor when actuated, which causes the capacitor to have an increasing voltage. After a period of time, the capacitor exceeds a voltage and, in response, a comparator actuates a corresponding output of the timer. The example process 1110 at block 1104 may also measure the time delays of different timer by, for example, selecting different timers via the multiplexer 325.

After measuring the time delay of each output, the example process 1100 then adjusts the time delay of the timers by any suitable process (block 1106). For example, the example process 1100 configures the adjustable voltage reference 818 in the example of FIG. 8 and the example process 1100 selectively uncouples one or more of the capacitors 912, 914, and 916 in the example of FIG. 9. In the examples of FIGS. 4, 6, and 7, the example process 1100 configures the compensation current to causes the examples to have a substantially constant time delay. The example process 1100 ends after adjusting the example timers.

Figure 12:
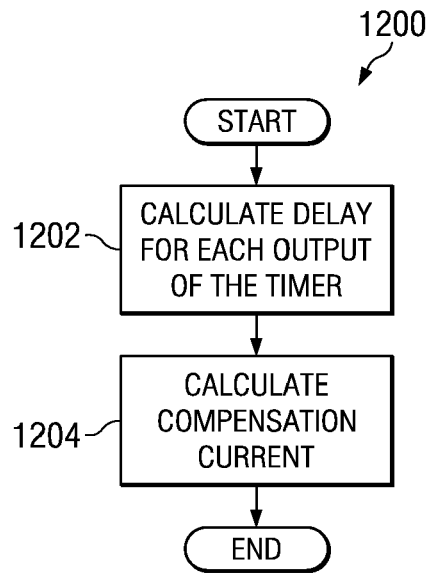
FIG. 12 is a flow diagram of an example process to determine the compensation current in the examples of FIGS. 4, 6, and 7.

FIG. 12 illustrates an example process 1200 to determine the compensation current in the examples of FIGS. 4, 6, and 7. Initially, the example process 1200 begins by calculating the capacitance of the corresponding capacitor of each output of the timer (block 1202). The capacitance of the corresponding capacitors is described by Equation 1 below:

$$C_{OUTPUT} = I_P \frac{t_{DELAY}}{V_{REF}} \quad \text{[Equation 1]}$$

where $C_{OUTPUT}$ is the capacitance of the corresponding output of the analog timer, $I_P$ is the predetermined current, $V_{REF}$ is the voltage of the reference voltage, and $t_{DELAY}$ is the time delay of the output of the timer. Further, at block 1202, the example process 1200 computes the capacitance for each different output of the timer.

After calculating the capacitances of the timers, the example process 1200 calculates at least one compensation current based on the configuration of the analog timer (block 1204). In the example of FIG. 6, the compensation current is determined by averaging the capacitances of the associated outputs. However, in the example of FIG. 7, a compensation current is determined for each individual output. In particular, the compensation current is determined by Equation 2 below:

$$I_{COMP} = C_{OUTPUT}\left(\frac{V_{REF}}{t_{DELAY}} - \frac{V_{REF}}{t_{DESIRED}}\right) \quad \text{[Equation 2]}$$

where $I_{COMP}$ is the compensation current that the compensation devices will provide and $t_{DESIRED}$ is the desired time delay of the associated output. Using the compensation current, the example process 1100 configures the compensation devices (e.g., compensation devices 620, 720, and 732, etc.) to provide the compensation current. The example process 1200 ends after calculating the compensation current.

In the illustrated examples, HDD preamplifier timers and methods to calibrate HDD preamplifier timers are disclosed. The timers allow precise control of actuating the devices associated with the transitions between a first operating condition to a second operating condition of a HDD. In particular, the example timers are precisely calibrated and vary less than 5%, thereby allowing the HDD to store and read data more densely on its associated platters as a result of improved timing. In addition, the example timers are insensitive to power supply variations, temperature, and semiconductor process variations. The compensation devices are easily and inexpensively incorporated into preamplifier devices. Further, the method to calibrate the timers is simple to implements via high volume test processes and does not add significant time or cost to such testing procedures.

Although certain methods, systems, and articles of manufacture have been described herein, the scope of coverage of this patent is not limited thereto. To the contrary, this patent covers all methods, systems, and articles of manufacture fairly falling within the scope of the appended claims either literally or under the doctrine of equivalents.

What is claimed is:

1. A timer in a hard disk drive preamplifier, comprising:
   a first switch to selectively store charge in a first storage device based on an input signal, the first storage device receiving a first current and storing the charge to cause the first storage device to have a first voltage that increases at a first rate;
   a compensation device to cause the first voltage to be substantially equal to a second voltage after a predetermined time period;
   a trigger to output a signal when the first voltage is substantially equal to the second voltage, the predetermined time period controlling transition time between a first hard disk drive operating condition and a second hard disk drive operating condition different than the first operating condition; and
   a second switch to selectively store charge in a second storage device based on a second input signal, the second storage device receiving a second current and storing the charge to cause the second storage device to have a third voltage that increases at a second rate; and
   a second trigger to output a signal when the third voltage of the second storage device exceeds a fourth voltage.

2. A timer as defined in claim 1, wherein the compensation device comprises an adjustable current source.

3. A timer as defined in claim 2, wherein the adjustable current source causes the first rate to be substantially equal to a predetermined rate.

4. A timer as defined in claim 1, wherein the compensation device comprises an adjustable voltage source.

5. A timer as defined in claim 4, wherein the adjustable voltage source is configured to cause the voltage of the first rate to increase to the second voltage in a time period substantially equal to the second voltage.

6. A timer as defined in claim 1, further comprising a second storage device, wherein the compensation device is to couple the first storage device or the second storage device to the switch based on the predetermined time delay.

7. A timer as defined in claim 1, further comprising a second compensation device to cause the third voltage to be substantially equal to the fourth voltage after a second predetermined time period.

8. A timer as defined in claim 7, wherein the second predetermined time period is different from the first predetermined time period.

9. A timer for use with a preamplifier circuit of a hard disk drive, the timer comprising:
   a comparator having first and second input terminals and an output terminal, wherein the first input terminal is coupled to receive a reference voltage signal;
   a current source adapted to be coupled between a first power source and the second input terminal;
   a compensation circuit in parallel with the current source and operative for varying an amount of current at the second input terminal;
   a transistor coupled to the second input terminal and a second power source, wherein an input signal either turns on or turns off the transistor; and
   a capacitor in parallel with the transistor,
   a second transistor to selectively store charge in a second capacitor based on a second input signal, the second capacitor receiving a third current and storing the charge to cause the second capacitor to have a voltage that increases at a second rate;
   a second trigger to output a signal when the voltage of the second capacitor exceeds the predetermined voltage; and
   a second compensation device to modify the third current to form a fourth current based on the second capacitor, the second compensation device causing the second rate to be substantially equal to a second predetermined rate, the second rate controlling a transition time between a first hard disk drive operating condition and a second hard disk drive operating condition different than the first operating condition,
   wherein the compensation circuit causes a time delay of the timer to substantially equal a predetermined value despite variations in the capacitor.

10. A timer as defined in claim 9, wherein the comparator is to output an output signal after a time delay substantially equal to a predetermined time delay.

11. A timer as defined in claim 9, wherein the comparator is to output an output signal when the voltage of the storage device exceeds the voltage of a voltage reference.

12. A timer as defined in claim 9, wherein the compensation circuit is to modify the current based on a capacitance of the first capacitor.

13. A timer for use with a preamplifier circuit of a hard disk drive, the timer comprising:
   a comparator having first and second input terminals and an output terminal, wherein the first input terminal is coupled to receive a reference voltage signal;
   a current source adapted to be coupled between a first power source and the second input terminal;
   a compensation circuit in parallel with the current source and operative for varying an amount of current at the second input terminal;
   a transistor coupled to the second input terminal and a second power source, wherein an input signal either turns on or turns off the transistor; and
   a capacitor in parallel with the transistor,
   a second transistor to selectively store charge in a second capacitor based on a second input signal, the second capacitor receiving a third current substantially equal to the second current and storing the charge to cause the second capacitor to have a voltage that increases at a second rate substantially equal to the predetermined rate; and
   a second comparator to output a signal when the voltage of the second capacitor exceeds the predetermined voltage,
   wherein the compensation circuit causes a time delay of the timer to substantially equal a predetermined value despite variations in the capacitor.

14. A timer as defined in claim 13, wherein the timer is operative with any of the following operating conditions comprising one of a read mode, a write mode, a sleep mode, an idle mode, a head select mode, or a bias change mode.

* * * * *